United States Patent
Arndt et al.

(10) Patent No.: US 6,976,395 B2
(45) Date of Patent: Dec. 20, 2005

(54) OPTICAL DEVICE FOR MEASURING PRESSURE OR FORCE

(75) Inventors: Dietmar Arndt, Dresden (DE);
Reinhard Hegewald, Dresden (DE);
Thomas Hellfeld, Bannewitz (DE);
Lutz Schmidt, Dresden (DE);
Bernhard Steiger, Frankenberg (DE)

(73) Assignee: ADZ Nagano GmbH (DE)

( * ) Notice: Subject to any disclaimer, the term of this patent is extended or adjusted under 35 U.S.C. 154(b) by 25 days.

(21) Appl. No.: 10/487,046

(22) PCT Filed: Aug. 2, 2002

(86) PCT No.: PCT/DE02/02856

§ 371 (c)(1),
(2), (4) Date: Feb. 17, 2004

(87) PCT Pub. No.: WO03/019127

PCT Pub. Date: Mar. 6, 2003

(65) Prior Publication Data

US 2004/0206184 A1 Oct. 21, 2004

(30) Foreign Application Priority Data

Aug. 16, 2001 (DE) .......................................... 101 40 823
Aug. 16, 2001 (DE) ...................................... 201 13 783 U

(51) Int. Cl.$^7$ .............................................. G01L 9/00
(52) U.S. Cl. ...................................... 73/705; 250/461.1
(58) Field of Search .............. 73/700, 705; 250/231.11, 250/227.14, 227.18, 227.19

(56) References Cited

U.S. PATENT DOCUMENTS

| 5,293,046 | A | * | 3/1994 | Wheatley | .................. | 250/458.1 |
| 6,612,174 | B2 | * | 9/2003 | Sittler et al. | .................. | 73/705 |
| 6,668,656 | B2 | * | 12/2003 | Fernald et al. | ................ | 73/705 |
| 6,710,355 | B2 | * | 3/2004 | Youngner | ................ | 250/458.1 |
| 2003/0146393 | A1 | * | 8/2003 | Youngner | ................ | 250/458.1 |

* cited by examiner

Primary Examiner—Edward Lefkowitz
Assistant Examiner—Andre Allen
(74) Attorney, Agent, or Firm—Robert W Becker & Associates; Robert W Becker

(57) ABSTRACT

The invention relates to optical devices for measuring pressure or force, comprising an electromagnetic radiation source, and a pressure membrane or a spiral spring which has a surface that at least partially reflects the electromagnetic rays of the electromagnetic radiation source. The inventive devices are especially characterized in that they allow, inter alia, measurement of even the slightest pressure changes of fluids and other flowable materials in the stationary and/or flowing state or even the slightest mechanical deformations on spiral springs. In order to do this, the rays of an electromagnetic radiation source are incident on the at least partially reflective surface of the pressure membrane or spiral spring. At least one section of a stationarily located body or of a stationarily located body having a reflective layer is disposed in the path of the reflected rays, upstream of a photodetector for said rays, and projects into said rays. A mechanical modification causes the reflected rays to be absorbed, diffracted, reflected again and/or split to a higher or lesser extent by the body.

14 Claims, 4 Drawing Sheets

OPTICAL DEVICE FOR MEASURING PRESSURE OR FORCE

BACKGROUND OF THE INVENTION

The invention relates to optical devices for measuring pressure or force with an electro-magnetic radiation source and a pressure membrane or a spring with a surface that at least partially reflects the electro-magnetic radiation of the electro-magnetic radiation source.

In DE 39 24 185 C1 (fiber optic pressure sensor), in DE 30 16 565 A1 (device for measuring and monitoring pressure within a limited, difficult to access space) and in EP 0 825 428 A2 (integrated optic-electronic combustion pressure sensor), the electro-magnetic radiation travels from, respectively, a radiation source via a light conductor cable to a pressure membrane and the reflected radiation travels via light conducting cable to photo detectors. The ends of the light-conducting cables are respectively arranged relative to the pressure membrane such that the exiting radiation fall onto the pressure membrane perpendicularly thereto. Moreover, the light-conducting cables terminate directly adjacent one another relative to the pressure membrane. In this manner, a portion of the reflected radiation travels, as a function of the deformation of the pressure membrane, to the ends of the light conducting cables, whereat such portion is branched in and further conducted to the photo detectors. The greater the deformation of the pressure membrane, the more diminished is the intensity of the radiation which reaches the photo detectors.

The disadvantage of the above-noted solutions is that, in particular, only a small portion of the reflected radiation is further conducted to the photo detectors. The sensitivity of the photo detectors consequently is substantially determinative of the measurement of the pressure against the pressure membrane. In particular, very small pressures or changes in pressure can only be measured to a limited extent.

The invention offers a solution to the problem of, on the one hand, so measuring the pressure of fluids or flow-capable substances in stationary and/or in flowing conditions that, as well, very small pressure deviations in fluid or in flow-capable substances can be captured or, on the other hand, in particular, to measure, in particular, small mechanical deformations on a spring caused by forces acting on the spring.

SUMMARY OF THE INVENTION

The inventive optical devices for measuring pressure or force are particularly characterized in that, among other measurement possibilities, as well the smallest pressure deviations of fluids or other flow-capable substances in stationary and/or in flowing condition, or, as well, the smallest mechanical deformations on springs, can be measured. This is achieved in that the radiation of an electro-magnetic radiation source falls on a pressure membrane or on the spring with an at least partially reflecting surface and, located in the reflected radiation path and located upstream, relative to such reflected radiation path, of a photo detector for such reflected radiation, is, at the least, a region of a fixedly constructed body extending into such reflected radiation path or a fixedly constructed body with a reflective coating extending into such reflected radiation path. With a pressure variation on the pressure membrane or a force variation on the spring, the reflected radiation of these embodiments is more or less absorbed by the body, is bent, is reflected again, and/or is sub-divided. The reflected radiation portion whose direction has not deviated, reaches a photo detector, or a first photo detector, with which the intensity of this portion of the reflected radiation is measured. By virtue of the body in the reflected radiation path, the measurement of the intensity of the electro-magnetic radiation falling on the photo detector or on the first photo detector is not only dependent upon an otherwise critical position or dimension of a radiation sensitive surface. The sensitivity is consequently shaped by

- the electro-magnetic radiation source,
- the reflection surface of the pressure membrane or the spring,
- the position of the body and
- the sensitivity and the geometry of the radiation-sensitive surface of the photo detector or the first photo detector, whereby it need only be ensured that the non-absorbed, non-bent, non-scattered and/or non-further reflected radiation and/or partial radiation falls completely onto the radiation-sensitive surface of the photo detector or the first photo detector. The sensitivity of the inventive optical device is thus substantially dependent upon the position of the body in the reflected radiation.

With a second photo detector for the radiation that is bent by the body, scattered, further reflected, and/or sub-divided, the sensitivity of the inventive optical device is further increased.

In this connection, those inventive optical devices with a body for absorbing the reflected radiation are suitable for the measurement of larger pressures or larger deformations of the spring and those inventive optical devices that still partially reflect the reflected radiation are suitable for the measurement of smaller pressures or smaller deformations of the spring.

A body in the path of the reflected radiation advantageously further leads to the benefit that a simple and economically producible injection molding housing of plastic can be used for the optical device. In this connection, the positions of the components can be determined via selection so that an automatic or partially automatic finished production of the device is possible.

Advantageous configurations of the invention are set forth below.

Since the electro-magnetic radiation source and the pressure membrane or the spring are so arranged, in a further configuration, that the electro-magnetic radiation of the electro-magnetic radiation source does not fall on the middle point of the pressure membrane or the spring, this leads to an increase of the sensitivity of the inventive optical device. Upon pressure or force variations, the geometric deformations in the form of bulges relative to the normal in the edge region of the pressure membrane or the spring are, relative to the middle region, at their largest due to the non-linear tension distribution of the existing bending moments.

A black disk or, at least, a black surface of the body, is, in accordance with a further configuration, characterized as a body that does not permit the passage therethrough of radiation and which absorbs the radiation falling thereon.

A prism in the role of the body in accordance with a further configuration leads to a deviation of the reflected radiation. In this manner, the surfaces of the prism that are angularly oriented to one another are used. The reflected radiation is thereby sub-divided. On the one hand, a portion of the reflected radiation can fall on a region of a surface of the prism, whereby the direction of this radiation upon exiting the angularly oriented surfaces is changed. On the other hand, the reflected radiation can fall onto an edge of the prism, in accordance with a further configuration, whereby a sub-division of the radiation is effected via the angularly oriented surfaces. In both above-noted circumstances, the intensities of the partial radiation change in the event of a deviation of the partial radiation, whereby the sum of the intensities is the same. In this manner, very small pressure or force variations can also be measured.

A lattice in the role of the body extending at least partially into the reflected radiation, in accordance with a further configuration, leads to partial bending. The bending occurs on the edges of the lattice rods. Via the geometric relationship of the lattice, various bending effects can be produced, whereby interferences and scattering of the reflected radiation occur following the lattice. In connection with a change of the direction of the reflected radiation occurring due to a geometric modification of the pressure membrane or the spring, various interference patterns occur. In this manner, various intensities can be measured on photo detectors disposed adjacent one another. Advantageously, the distance between adjacent lattice rods is not the same so that a relatively large spatial separation of intensity differences can be achieved.

The reflected radiation is, in accordance with a further configuration, influenced such that the radiation beam position is varied. As a consequence thereof, the intensity varies of that reflected radiation which ultimately falls onto the photo detector. It is achieved by this configuration that the portion of the surface of the body which is disposed in the direction of the reflected radiation, or the body, is so configured that the reflected radiation is absorbed, reflected, or transmitted as a function of location.

At least one device that is disposed in the direction of the radiation downstream of the electro-magnetic radiation source and specifically configured to diffract the electro-magnetic radiation upon incidence of the electro-magnetic radiation thereon and having an inner surface or a region to predominantly reflect the electro-magnetic radiation once the electro-magnetic radiation is incident thereon enlarges, in accordance with a further configuration, the spatial distance between the pressure membrane or the spring on one side and the electro-magnetic radiation source, the body, and the at least one photo detector on the other side. Via the deployment of a device comprising of a heat resistant substance, the pressure of fluids or flow-capable substances with high temperatures can, in particular, be measured.

A favorable configuration of the device is recited in a further embodiment in which at least two immediately adjacent flat parallel disks are provided comprised of a transparent substance. The flat parallel disks are thereby advantageously so configured that the entrance directions and the exit directions of the electro-magnetic radiation and the reflected electro-magnetic radiation are the same or substantially the same. In this manner, equivalent arrangements exist so that the electro-magnetic radiation source, the body, and the at least one photo detector can be configured as a component and can be deployed with or without the device in a form; for example, the flat parallel disks are deployable relative to the pressure membrane or the spring. In this connection, there is a provided a universally deployable component.

A circuit arrangement provided in a further configuration produces at its output an electric signal which signals the relationship of the radiation performance as an indication of the difference between the intensity of the reflected electro-magnetic radiation on the first photo detector and the further reflected radiation on the second photo detector. In this connection, small pressure or force variations, as well, lead to a relatively large electrical output value. At the same time, a circuit structure with low-ohm inputs can be deployed, so that electrical disturbances do not corrupt or distort the measurement values or so that protection measures relative to such disturbances are not necessary.

Advantageous electro-magnetic radiation sources are described in a further configuration and comprise a semi conductor laser or a luminescent diode.

In accordance with a further configuration, the at least one photo detector is a photo diode.

Such electro-magnetic radiation sources and photo detectors are respectively integrateable onto a carrier such as for example, a chip comprised of an electronic semi conductor. These are available via known technologies so that an economically favorable inventive optical device is provided.

Favorable configurations of the membrane set forth in a further configuration comprise a disk, a wall region of a tube-shaped body, or a tube-shaped body. In particular, the latter of these listed items are suitable for the measurement of the pressure of flowing substances, as such items are directly integratable into the existing conduit systems.

A further configuration of the inventive optical device provides a compact component group which, via the connection of operating elements and/or construction components, is easily mountable and can be bundled in existing conduit systems or force measuring systems or in such systems which are to be configured. Such elements or construction systems are, for example, boreholes, tapped bore holes, set screws, or projections for adhesive mounting.

BRIEF DESCRIPTION OF THE DRAWINGS

Embodiments of the invention are shown in the figures of the drawings and are hereinafter described in more detail.

It is shown.

DESCRIPTION OF SPECIFIC EMBODIMENTS

1. Embodiment

Figure 1:
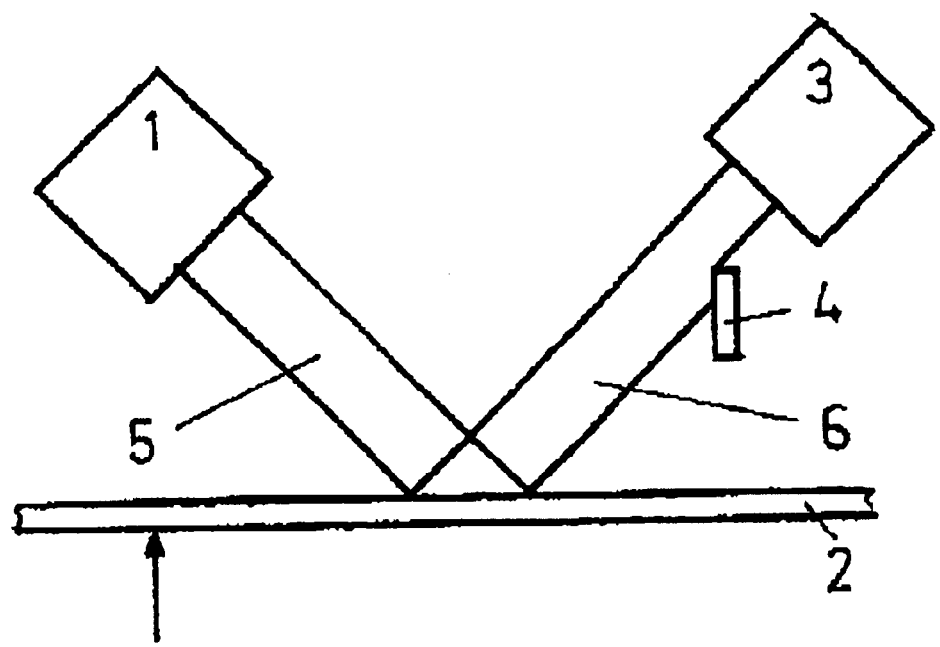
FIG. 1 a principle illustration of an optical device for measuring the pressure with a photo detector, FIG. 2 a principle illustration of an optical device for measuring the pressure with two photo detectors, FIG. 3 a principle illustration of an optical device for measuring the pressure with a prism, whereby the reflected radiation falls on an edge of the prism, FIG. 4 a principle illustration of an optical device for measuring the pressure with a prism, whereby the reflected radiation falls on a surface of the prism, FIG. 5 a block diagram of a circuit for processing electric signals of the photo detectors and FIG. 6 a principle illustration of an optical device for measuring the pressure with a device with multiple reflections.

An optical device for measuring the pressure comprises, in a first embodiment, an electro-magnetic radiation source 1, a pressure membrane 2 with a surface for at least partially reflecting the electro-magnetic radiation 5 of the electro-magnetic radiation source 1, a body 4 extending into the reflected radiation 6, and a photo detector 3.

The electro-magnetic radiation source 1 is, in particular, a semi conductor laser or a luminescent diode and the photo detector 3 is preferably a photo diode. The pressure membrane 2 is a disk, at least a component of a tube-shaped body, or is a tube-shaped body.

The electro-magnetic radiation source 1 is disposed relative to the pressure membrane 2 in such a manner that the electro-magnetic radiation 5 falls at an angle between 0 and less than/equal to 90° onto the reflecting surface of the pressure membrane 2, whereby the receiving surfaces are not disposed in the middle point of the pressure membrane 2. The body 4 and the photo detector 3 are, on the one hand, in the path of the thus reflected radiation 6. The body 4 is located such that it is partially impacted by the reflected radiation 6 in the condition as well in which the pressure membrane 2 is not subjected to a pressure and the body 4 is disposed between the photo detector 3 and the pressure membrane 2. The body 4 is either a black disk or possesses, at least, a black surface. In this manner, a portion of the reflected radiation 6 is absorbed so that a portion of the reflected radiation 6 falls onto the photo detector 3. In connection with increasing pressure, the portion of the reflected radiation 6 falling on the photo detector 3 decreases. In the embodiment shown in FIG. 1, an optical device for measuring such pressure is illustrated in principle.

2. Embodiment

Figure 2:
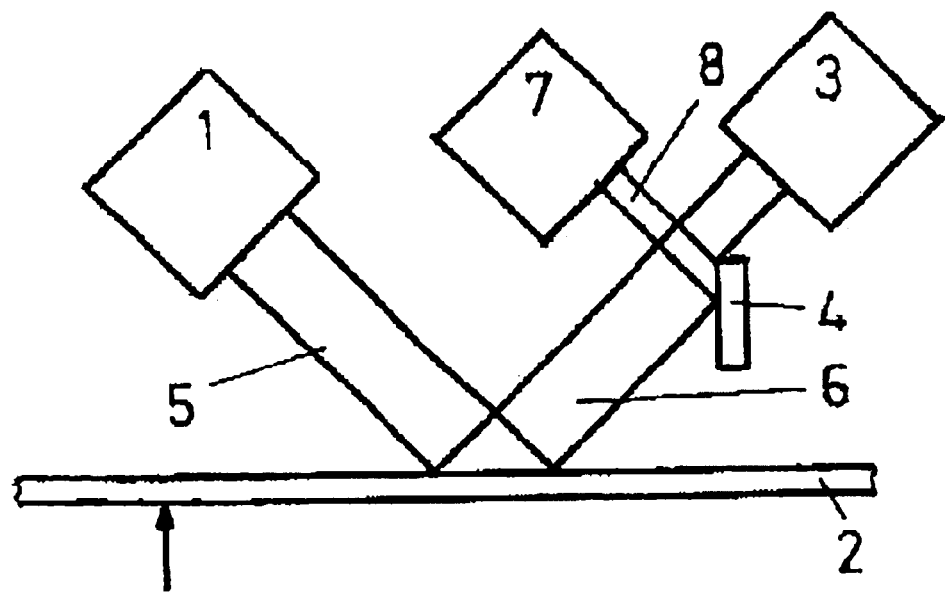

An optical device for measuring the pressure comprises, in a second embodiment, an electro-magnetic radiation source 1, a pressure membrane 2 with a surface for at least partially reflecting the electro-magnetic radiation 5 of the electro-magnetic radiation source 1, a body 4 extending into the reflected radiation 6, and a first and second photo detector 3, 7 (illustrated in FIG. 2). The electro-magnetic radiation source 1 is, in particular, a semi conductor laser or a luminescent diode and the photo detectors 3, 7 are preferably photo diodes. The pressure membrane 2 is a disk, at least a component of a tube-shaped body, or is a tube-shaped body.

The electro-magnetic radiation source 1 is disposed relative to the pressure membrane 2 in such a manner that the electro-magnetic radiation 5 falls at an angle between 0 and less than/equal to 90° onto the reflecting surface of the pressure membrane 2, whereby the receiving surfaces are not disposed in the middle point of the pressure membrane 2. The body 4 and the photo detector 3 are, on the one hand, in the path of the thus reflected radiation 6. The body 4 is located such that it is partially impacted by the reflected radiation 6 in the condition as well in which the pressure membrane 2 is not subjected to a pressure and the body 4 is disposed between the first photo detector 3 and the pressure membrane 2. At least the surface of the body 4, which extends into the reflected radiation 6, has a reflecting capability so that a portion of the reflected radiation 6 is further reflected as further reflected radiation 8. The second photo detector 7 is disposed in the radiation beam path of the further reflected radiation 8. Upon increasing pressure, the portion of the reflected radiation 6 falling on the first photo detector 3 decreases and the portion of the further reflected radiation 8 falling on the second photo detector increases. In the illustration in FIG. 2, an optical device for measuring the pressure is illustrated in principle. In a further embodiment, the components of the optical device can also be arranged such that the portion of the radiation falling on the first photo detector increases in association with increasing pressure and the portion of the radiation falling on the second photo detector decreases. The electrical outputs of the first and second photo detectors 3, 7 are connected with the inputs of a subtraction circuit 9 and an addition circuit 10 and their outputs are connected with the inputs of a division circuit 11 (illustration in FIG. 3).

3. Embodiment

Figure 3:
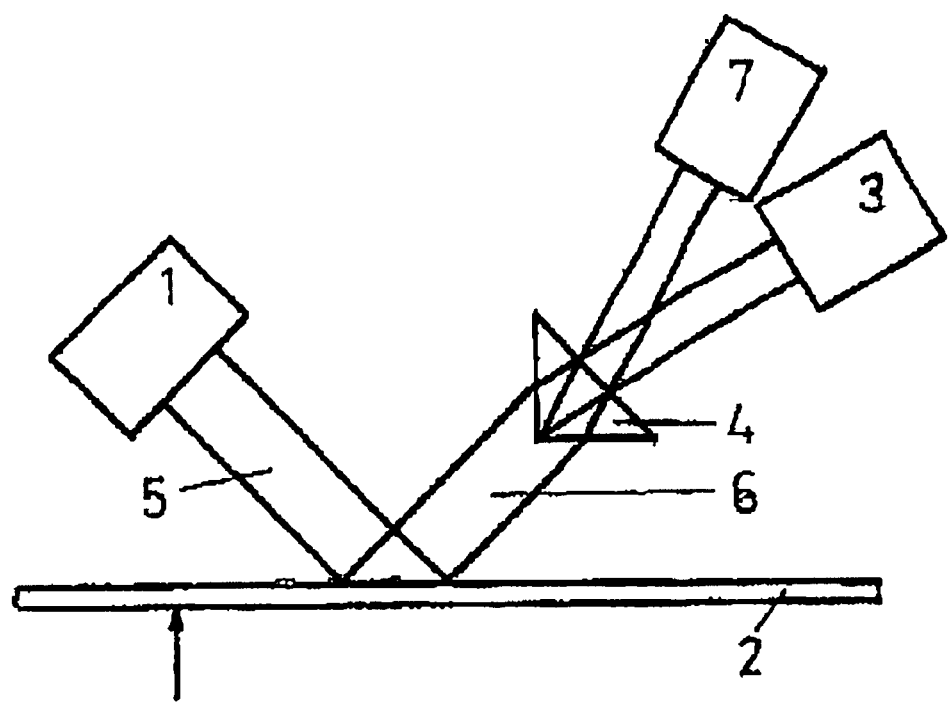
Figure 4:
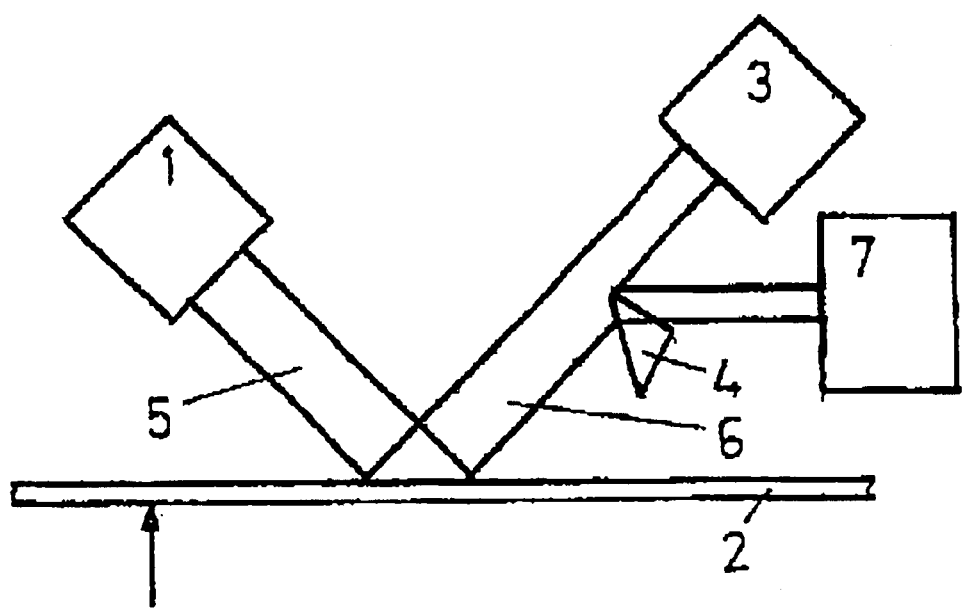

An optical device for measuring the pressure comprises, in a third embodiment, comprises an electro-magnetic radiation source 1, a pressure membrane 2 with a surface for at least partially reflecting the electro-magnetic radiation 5 of the electro-magnetic radiation source 1, a body 4 extending into the reflected radiation 6, and a first and second photo detector 3, 7 (illustrated in FIGS. 3 and 4).

The electro-magnetic radiation source 1 is, in particular, a semi conductor laser or a luminescent diode and the photo detector 3 is preferably a photo diode. The pressure membrane 2 is a disk, at least a component of a tube-shaped body, or a tube-shaped body.

The electro-magnetic radiation source 1 is disposed relative to the pressure membrane 2 in such a manner that the electro-magnetic radiation 5 falls at an angle between 0 and less than/equal to 90° onto the reflecting surface of the pressure membrane 2, whereby the receiving surfaces are not disposed in the middle point of the pressure membrane 2. The body 4 is in the path of the thus reflected radiation 6.

In a first configuration of the body 4, the body is a prism. The reflected radiation 6 falls on the edges that are formed by the surfaces of the prism at right angles to one another (illustrated in FIG. 3). Advantageously, in connection with the circumstances of a pressure membrane 2 having pressure applied thereto, the edges of the prism are not disposed in the middle, or substantially in the middle, of the reflected radiation 6. The reflected radiation 6 is sub-divided by the prism. The first and second photo detectors 3, 7 are disposed in the radiation beam directions of both partial radiation portions.

In a second configuration, the body 4 is a prism that is disposed only partially in the radiation beam path of the reflected radiation 6. The reflected radiation 6 falls, preferably, in the event that the pressure membrane 2 does not have a pressure applied thereto, partially onto a surface (illustration in FIG. 4). A first portion of the reflected radiation 6 thus reaches the first photo detector without having been influenced. The second portion of the reflected radiation 6 is diverted via the body 4 configured as a prism. In this manner, the reflected radiation 6 is sub-divided. The second portion of the reflected radiation 6 reaches the second photo detector 7.

In a third configuration, the body 4 is configured as a lattice. With the lattice rod at various spacings from one another, there is produced various bending effects of the reflected radiation 6 so that a movement of the reflected radiation 6 is constructively effected. The first and second photo detectors 3, 7 are disposed adjacent one another.

In connection with increasing pressure, the portion of the reflected radiation 6 falling on the first photo detector decreases and the portion of the reflected radiation 6 falling on the second photo detector 7 increases. In a further configuration, the components of the optical device can also be so arranged that the portion of the radiation falling on the first photo detector increases in connection with increasing pressure and the portion of the reflected radiation falling on the second photo detector 7 decreases.

Figure 5:
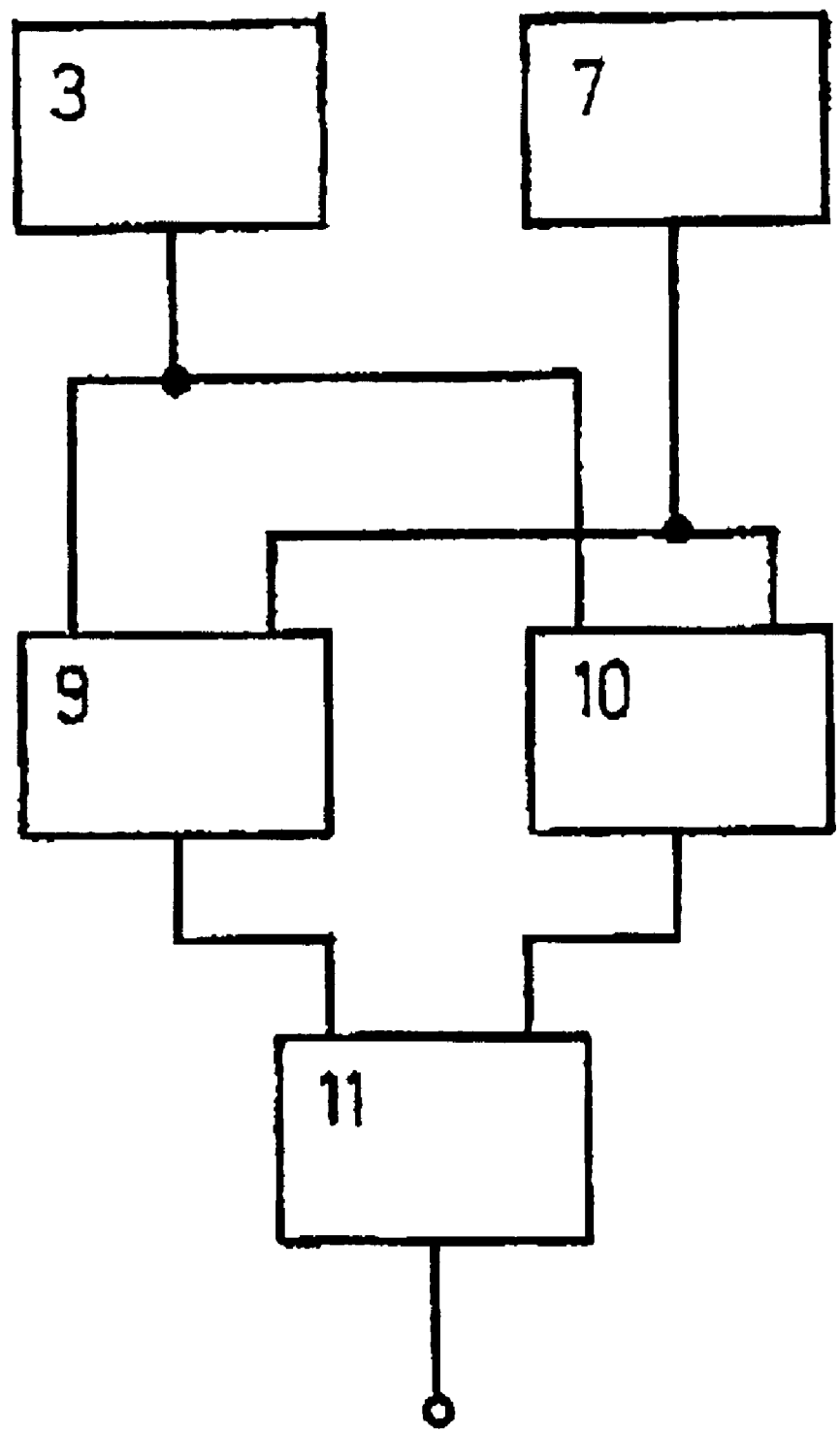

The electrical outputs of the first and second photo detectors 3, 7 are connected with the inputs of a subtraction circuit 9 and an addition circuit 10 and their outputs are connected with the inputs of a division circuit 11 (illustration in FIG. 5).

Figure 6:
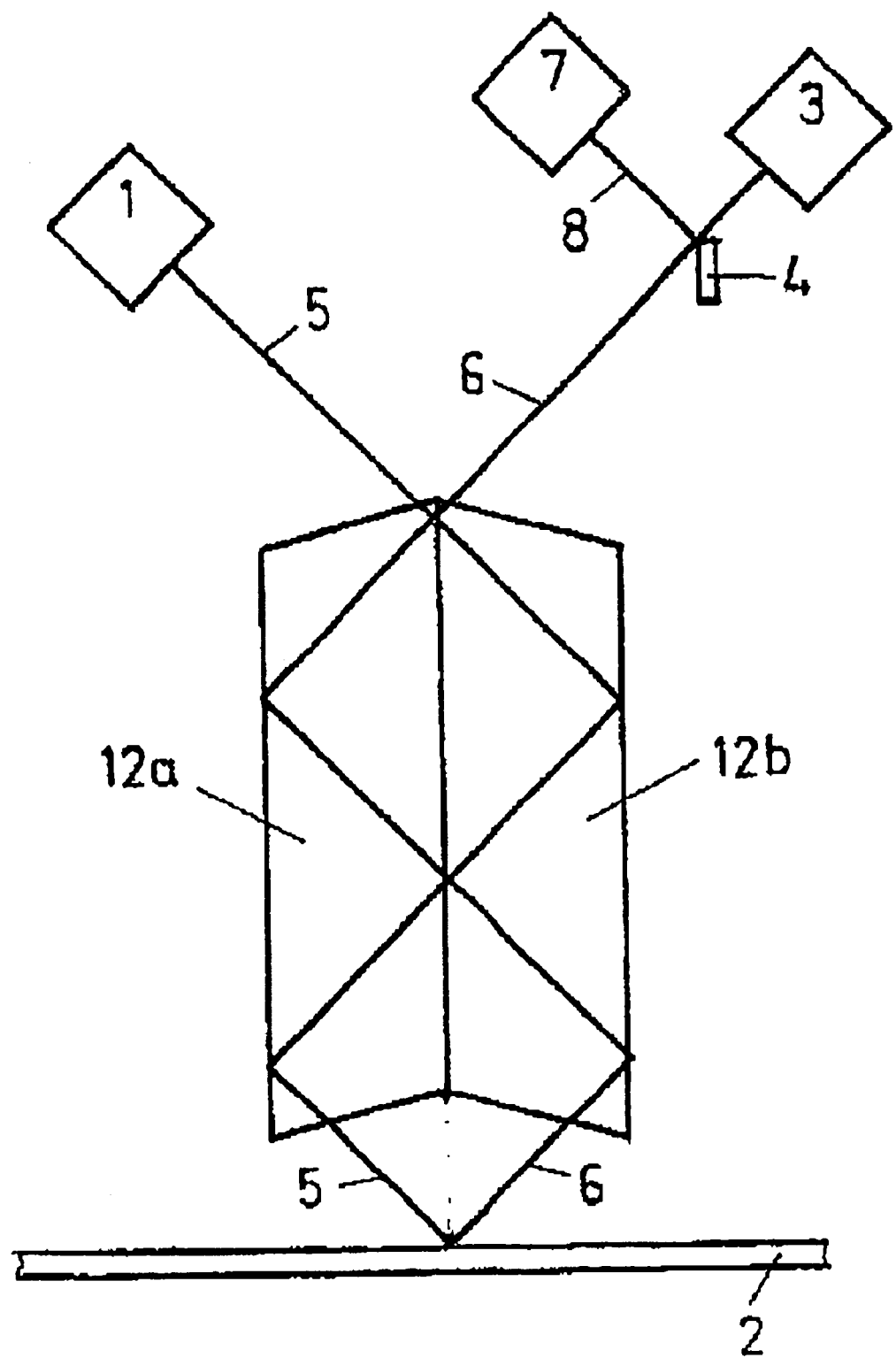

In further configurations of the optical devices for measuring pressure corresponding to the first, second, or third embodiments described herein, at least one device that is disposed in the direction of the radiation downstream of the electro-magnetic radiation source 1 and specifically configured to diffract the electro-magnetic radiation 5 upon incidence of the electro-magnetic radiation thereon and having an inner surface or a region to predominantly reflect the electro-magnetic radiation 5 once the electro-magnetic radiation is incident thereon can be arranged such that, on the one hand, the electro-magnetic radiation 5 falls at an angle between 0 and less than/equal to 90° onto the reflecting surface of the pressure membrane 2 and, on the other hand, the reflected radiation 6 traveling in a direction other than the respective direction in which it is incident upon the device again exits the device (illustrated in FIG. 6). The device preferably comprises at least two immediately adjacent flat parallel disks 12a, 12b comprised of a transparent substance.

The entrance directions and the exit directions of the electro-magnetic radiation 5 and the reflected electro-magnetic radiation 6 are the same or nearly the same. The arrangements of the body 4 and either the photo detector 3 or the first and second photo detectors 3, 7 correspond to those of the same respective elements of the first through third embodiments herein described including their configurations.

Instead of the pressure membranes 2 of the first through third embodiments herein described including their configurations, the pressure membrane 2 can be, in further configurations, a spring for measuring force. Accordingly, in the illustrations of FIGS. 1–4 and 6, the pressure membrane 2 is a straight spring. The cross-section of the straight spring can be configured as multiple-cornered as well as also in the form of a conical section. The spring, when so configured, has one side in tension, multiple sides in tension, or, in particular, in connection with the use of a spring disk, has all sides in tension. The force is applied against the spring such that there exists a deformation of the body of the straight spring the same as that of the deformation of the pressure membrane 2 of the first through third embodiments herein described including their configurations. The surface that at least partially reflects the electro-magnetic radiation of the electro-magnetic radiation source 1 is located on the surface or surfaces subjected to deformation. The construction and arrangement of the electro-magnetic radiation source 1, the body 4, either the photo detector 3 or the first and second photo detectors 3, 7 and the device specifically configured to diffract the electro-magnetic radiation 5 upon incidence the electro-magnetic radiation thereon and having an inner surface or a region to predominantly reflect the electro-magnetic radiation 5 once the electro-magnetic radiation is incident thereon, especially in the form of the flat parallel disks 12a, 12b, correspond to the same respective elements of the first through third embodiments herein described including their configurations.

In further configurations, the spring can also be a spiral spring with spacings between coil windings, a turning spring, a straight torsional spring, or a helical spring, whereby at least a portion of the surface subjected to deformation upon the application of a force is the surface that at least partially reflects the electro-magnetic radiation of the electro-magnetic radiation source 5 or comprises the surface that at least partially reflects the electro-magnetic radiation of the electro-magnetic radiation source 1.

Preferably, at least the electro-magnetic radiation source 1, the photo detector 3, or, as well, the first and, also, the second, photo detector 3, 7, and the body 4 are components of a housing that is, in particular, provided with the elements or constructions for performing an interconnecting function.

The specification incorporates by reference the disclosure of German priority documents 101 40 823.4, 201 13 783.6 both filed Aug. 16, 2001 as well as PCT/DE02/02856 filed Aug. 2, 2002.

The present invention is, of course, in no way restricted to the specific disclosure of the specification and drawings, but also encompasses any modifications within the scope of the appended claims.

What is claimed is:

1. An optical device for measuring pressure or force, comprising:
   an electro-magnetic radiation source for emitting electro-magnetic radiation
   at least one photo detector;
   a fixedly constructed body having a selected one of a reflective coating and no reflective coating; and
   an electro-magnetic radiation reflecting element formed of at least one of a pressure membrane and a spring each having a reflecting surface that, upon impingement thereon of the electro-magnetic radiation emitted by the electro-magnetic radiation source, at least partially reflects such radiation as a reflected radiation, the electro-magnetic radiation source being arranged relative to the electro-magnetic radiation reflecting element such that the electro-magnetic radiation falls at an angle between 0° and no more than 90° onto the reflecting surface of the respective pressure membrane or spring of the electro-magnetic radiation reflecting element, and the fixedly constructed body being configured such that, in connection with a selected one of a condition in which the electro-magnetic radiation reflecting element does not have a pressure applied thereagainst and a condition in which the electro-magnetic radiation reflecting element has a pressure applied thereagainst, at least a portion of the fixedly constructed body extends into the reflected radiation that is reflected from the electro-magnetic radiation reflecting element so as to cause a portion of the reflected radiation to be at least one of substantially absorbed, bent, scattered, further reflected, and sub-divided, and the at least one photo detector being arranged relative to the fixedly constructed body for impingement thereon of the reflected radiation that has been alternatively reflected, bent, scattered, further reflected or sub-divided.

2. An optical device according to claim 1, wherein the electro-magnetic radiation source and the electro-magnetic radiation reflecting element are arranged such that the electro-magnetic radiation of the electro-magnetic radiation source does not fall on a middle point of the electro-magnetic radiation reflecting element.

3. An optical device according to claim 1, wherein the body is a selected one of a black disk and a body having at least a black over surface.

4. An optical device according to claim 1, wherein the body is a prism.

5. An optical device according to claim 4, wherein an edge of the prism is disposed in the path of the reflected radiation.

6. An optical device according to claim 1, wherein the body is a lattice having a plurality of rods, the lattice being at least partially disposed in the reflected radiation and the distance between adjacent rods of the lattice is a selected one of the same and not the same.

7. An optical device according to claim 1, wherein the direction of the reflected radiation falling on the body is configured such that the reflected radiation is absorbed, reflected, or transmitted as a function of location.

8. An optical device according to claim 1, wherein the electro-magnetic radiation reflecting element is disposed in the direction of the electro-magnetic radiation traveling downstream of the electro-magnetic radiation source and is configured to diffract, upon its incidence thereon, the electro-magnetic radiation emitted by the electro-magnetic radiation source, and the electro-magnetic radiation reflecting element comprises a region for predominantly reflecting the electro-magnetic radiation once the electro-magnetic radiation is incident thereon with the region being so configured that, on the one hand, the electro-magnetic radiation falls at an angle between 0 and at the most 90° onto the reflecting surface of the electro-magnetic radiation reflecting element and, on the other hand, the reflected radiation, as it exits the electro-magnetic radiation reflecting element, travels in a direction other than the respective direction in which the electro-magnetic radiation is incident upon the electro-magnetic radiation reflecting element.

9. An optical device according to claim 1, wherein the electro-magnetic radiation reflecting element is comprised of at least two immediately adjacently arranged flat parallel disks each comprised of a transparent substance and the entrance directions and the exit directions of the electro-magnetic radiation and the reflected radiation relative to the electro-magnetic radiation reflecting element are at least substantially the same.

10. An optical device according to claim 1, and further comprising a second photo detector and wherein electrical outputs of the at least one photo detector and the second photo detector are connected with the inputs of a subtraction circuit and an addition circuit and the outputs of the subtraction circuit and the addition circuit are connected with the inputs of a division circuit.

11. An optical device according to claim 1, wherein the electro-magnetic radiation source is a selected one of a semi conductor laser and a luminescent diode.

12. An optical device according to claim 1, wherein the photo detector is a photo diode.

13. An optical device according to claim 1, wherein the electro-magnetic radiation reflecting element is a selected one of a disk-shaped body, a component of a tube-shaped body, and a tube-shaped body.

14. An optical device according to claim 1, wherein the electro-magnetic radiation source, the at least one photo detector, and the body are components of a housing and the housing is provided with one of a plurality of elements for performing an interconnecting function and a construction for performing an interconnecting function.

* * * * *